June 14, 1927. D. D. EVINS Re. 16,653

ATTACHMENT FOR CHIROPRACTIC TABLES

Original Filed Oct. 23, 1920

Inventor:
Dossa D. Evins,
By Parker & Carter
Attys.

Reissued June 14, 1927. Re. 16,653

UNITED STATES PATENT OFFICE.

DOSSA D. EVINS, OF DAVENPORT, IOWA, ASSIGNOR TO FRANK W. ELLIOTT, OF DAVENPORT, IOWA.

ATTACHMENT FOR CHIROPRACTIC TABLES.

Original No. 1,504,111, dated August 5, 1924, Serial No. 419,122, filed October 23, 1920. Application for reissue filed August 4, 1926. Serial No. 127,190.

This invention relates to chiropractic tables and the principal object is to provide an attachment for a table of this kind with power driven means for moving the table from horizontal position to substantially a vertical position and vice versa. Electric or water motors, gas, steam or air engines may be used for power, but in this disclosure an electric motor attachment is described.

Another object is to provide a device of this nature in which both the movement of the table from horizontal to vertical position and from vertical to horizontal position may be attained by movement of the power shaft and gears in the same directions in both instances without the necessity of resorting to reversing mechanisms, using one half cycle for lowering and the other half cycle for raising.

Another object is to provide a substantially noiseless gearing for effecting said movements.

Another object is to provide an automatic stopping device.

Other objects will appear from the following description and claims.

One embodiment of the invention is shown in the accompanying drawing comprising one sheet, in which:—

Like characters of reference refer to like parts in all views.

Figure 1:
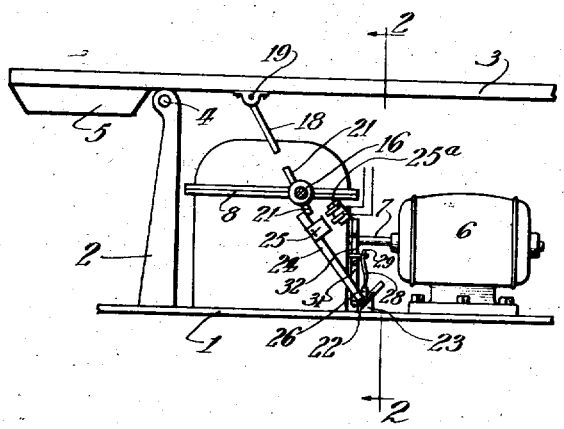
Figure 1 is a side elevation of my improved invention, the table being shown in a horizontal position.
Figure 2:
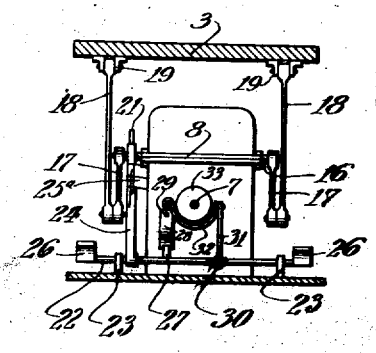
Figure 2 is a sectional view taken on the lines 2—2 of Figure 1.

Referring to the drawings in detail, 1 represents the base of a chiropractic table, and 2 represents a pair of uprights which carry at their upper ends the table top 3 pivotally mounted at 4 and provided with a suitable counter weight 5. The counter weight may be omitted if desired.

Mounted on the base 1 is an electric motor conventionally shown at 6 and including a power shaft 7. Also mounted on base 1 is a gear box or housing 8 which is oil-tight and is provided with bearings 9 and 10 for the power shaft 7. Between bearings 9 and 10, the shaft 7 is provided with a worm 11.

Meshing with worm 11 is a worm gear 12 secured to a stub shaft 13 having its bearings in the side walls of the housing 8. Mounted on the stub shaft 13 is a pinion 14 which meshes with a gear 15 mounted on a stub shaft 16. Shaft 16 has bearings on the side walls of the housing 8 and extends beyond said walls at each side and has secured to it arms 17. To the free end of each arm 17 is attached one end of a respective connecting rod 18, the other end of which is pivoted to the under side of the table 3 at 19. It is, of course, understood that the number of gears may vary according to the desired speed and power ratio between the power shaft and the table.

The gear box 8 is oil tight and filled with oil 20 to render operation of the gears substantially noiseless and insure long life without attention.

Figure 4:
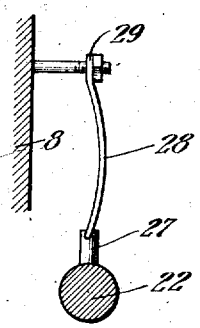
Figure 4 is a detail view of the tension spring.

Mounted for rotation with shaft 16 is a pair of diametrically extending arms 21. A shaft 22 is mounted for oscillation in bearings 23 on the base and has secured to it an upwardly extending arm 24 the free end of which is in the same plane as the arms 21 and is adapted to be moved into and out of the path of arms 21 by oscillation of shaft 22. Arm 24 carries one member 25 of a switch having contacts $25^a$ mounted on the framework, which contacts are connected in the motor circuit so that when member 25 contacts member $25^a$, the circuit is closed and the motor will be operated. Shaft 22 is provided with foot levers or pedals 26, and is provided with a radially extending lug or pin 27 in the outer face of which is provided a bearing for the lower end of a flat spring 28 secured to the framework at 29. The construction and arrangement of this spring are best shown in Figure 4.

A pin 30 extends radially from shaft 22 and carries an upwardly extending link 31 which is connected to a brake-band 32 mounted in operative relation to a brake-drum 33 on the power shaft 7.

Figure 3:
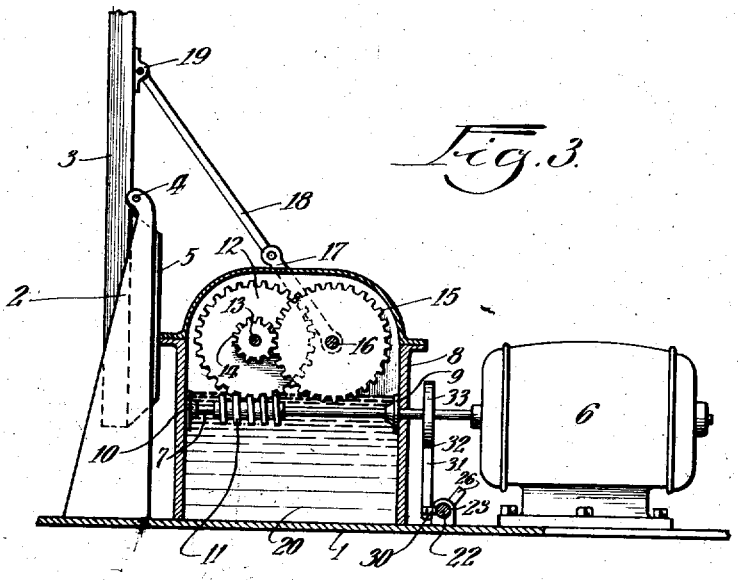
Figure 3 is an enlarged vertical sectional view therethrough, the table being shown in its vertical position.

In operation, the table is normally in the vertical position shown in Figure 3. The operator places his foot on pedal 26 and the shaft 22 is oscillated until pressure of spring 28 passes the center of shaft 22, then said spring rotates the shaft until the switch 25, 25ª is closed, thereby starting the motor. Thereupon shaft 7 causes worm 11 to drive gears 12, 14 and 15, and through shaft 16 rotates arms 17 thereby moving rods 18 to rotate the table 3 about its pivot until the table approaches its horizontal position as shown in Figure 1. One of the arms 21 will now come against arm 24 and move it rearwardly until the spring 28 moves over the center of shaft 22, whereupon said spring will oscillate shaft 22 back to its normal or inoperative position with the switch 25, 25ª open. As the shaft 22 moves back to normal position pin 30 and link 31 raise the brake-band 32 into contact with the drum 33 and this brake tends to quickly overcome the momentum and stop the table. The parts are to be so positioned that the stopping points in raising and in lowering will be with the eccentric 17 on "dead center" so that when the motor is started, the load will be at its lightest and the movement slightest. This prevents sudden and jerky stop and start; and permits the use of small induction motors; also doing away with the use of reversing mechanism.

While I have described what I deem to be the most desirable embodiment of my invention, it is obvious that many of the details may be varied without in any way departing from the spirit of my invention, and I therefore do not limit myself to the exact details herein set forth, nor to anything less than the whole of my invention limited only by the appended claims.

What is claimed as new is:—

1. A chiropractic table comprising a base, a platform pivotally mounted above said base, a gear box mounted on said base below said platform, gearing mounted in said gear box, a motor having its shaft extending into said gear box and provided with a worm for operating said gearing, arms operable by said gearing, connecting rods operable by said arms and having pivotal connection with said platform, an electric switch for controlling the operation of said motor, foot actuated means for closing said switch to cause movement of said platform in either direction, and automatic means for opening said switch upon the limit of movement of said platform in either direction, and a brake device automatically operable by the opening of said switch for overcoming the momentum of said platform.

2. A table of the character described comprising a base, a pair of spaced uprights rising from the base, a top pivotally secured adjacent one end of the upper ends of the uprights, a gear box fixed to the base, a motor driven shaft passing longitudinally therethrough, a worm fixed to the inner end of the motor driven shaft, a stub shaft arranged at right angles to a motor driven shaft and rotated through the medium of a train of gears associated with the worm, arms secured to the ends of the stub shaft, connecting rods pivotally secured to the arms and table top respectively in a manner whereby said table top is moved in a vertical plane, a pair of diametrically oppositely disposed extending arms formed on the stub shaft, switch means for controlling the motor, and arranged in the path of the diametrically oppositely disposed extending arms, a foot control lever mounted for oscillatory movement to the base, an arm rising from said foot control lever and carrying one of the members of the switch, and brake means associated with said foot lever and including means fixed to the motor driven shaft.

3. A chiropractic table comprising a base, supporting means upwardly projecting from said base, a table member pivoted on said supporting means for rotation about a horizontal axis, a motor associated with said base, a power shaft, power transmission means whereby movement of said shaft in a single direction may cause movement of said table member in reverse directions, and means for automatically terminating the movement of said shaft at the termination of the predetermined excursions of the table member, including a switch, and means, associated with such power transmission for opening the switch.

4. A chiropractic table comprising a base, a supporting means upwardly projecting from said base, a table member pivoted on said supporting means for rotation about a horizontal axis, a motor associated with said base, a driving connection between said motor and said table member and automatically operable braking means adapted to overcome the momentum of the driving members and to terminate the movement of the table member at the end of its predetermined excursions, including a drum on the motor shaft, an arcuate brake band associated with it, and means for automatically bringing them into frictional engagement.

5. A chiropractic table comprising a base, a supporting means upwardly projecting from said base, a table member pivoted on said supporting means for rotation about a horizontal axis, a motor associated with said base, a driving connection between said motor and said table member, a motor controlling switch, means for opening said switch at the termination of the predetermined excursions of the table member, and means, associated with said switch controlling means, adapted to brake the driving connection between motor and table member at the end of such predetermined excursions.

6. A chiropractic table comprising a base, a supporting means upwardly projecting from said base, a table member pivoted on said supporting means for rotation about a horizontal axis, a motor associated with said base, a driving connection between said motor and said table member, a motor controlling switch having a fixed member mounted above said base, a movable member opposed thereto, a supporting element upon which said movable member is mounted, means for moving said supporting element and said movable switch member into switch closing position, automatic means for moving them into open position, braking means for said table member, and means, associated with said supporting element and responsive to its movement, for actuating said braking means when the switch is opened.

7. A chiropractic table comprising a base, a supporting means upwardly projecting from said base, a table member pivoted on said supporting means for rotation about a horizontal axis, a motor associated with said base, a driving connection between said motor and said table member, an electric switch adapted to control said motor and automatic means for opening said switch at the termination of the predetermined excursions of the table member including a shaft adapted to be rotated in a single direction and a plurality of members outwardly projected therefrom and adapted in turn to engage the switch as the shaft is rotated.

8. A chiropractic table comprising a base, a supporting means upwardly projecting from said base, a table member pivoted on said supporting means for rotation about a horizontal axis, a motor associated with said base, a driving connection between said motor and said table member, an electric switch adapted to control said motor and automatic means for opening said switch at the termination of the predetermined excursions of the table member, said switch comprising a fixed member, a movable member opposed thereto, a supporting element upon which said movable member is mounted and means, associated with the driving connection between motor and table member, adapted to move said switch into open position.

9. A chiropractic table comprising a base, a supporting means upwardly projecting from said base, a table member pivoted on said supporting means for rotation about a horizontal axis, a motor associated with said base, a driving connection between said motor and said table member, an electric switch adapted to control the motor, said switch comprising a fixed member, a movable member opposed thereto, a pivoted supporting element upon which such movable member is mounted, and an arm, associated with the driving connection between motor and table member, adapted to engage said supporting element to move said switch into open position at the termination of each predetermined excursion of the table member.

10. A chiropractic table comprising a base, supporting means upwardly projecting from said base, a table member pivoted on said supporting means for rotation about a horizontal axis, a motor associated with said base, a power shaft, means whereby movement of said shaft in a single direction may cause the movement of said table member in reverse directions, an electric switch adapted to control said motor, said switch comprising a fixed member, a movable member opposed thereto, and a plurality of knockout members adapted to be actuated in response to rotation of said power shaft, one of said members being positioned to contact the movable switch member and to open the switch at the termination of each predetermined excursion of the table member in either direction.

11. A chiropractic table comprising a base, a supporting means upwardly projecting from said base, a table member pivoted on said supporting means for rotation about a horizontal axis, a motor associated with said base, a power shaft, means whereby movement of said shaft in a single direction may cause movement of said table member in reverse directions, and means for automatically terminating the movement of said shaft at the termination of the predetermined excursions of the table member, including an electric switch adapted to control said motor and automatic means for opening said switch at the termination of the predetermined excursions of the table member, said switch including a fixed member, a movable member, a rock shaft, an arm on which said movable member is mounted, and a member, associated with the driving connection between motor and table member, adapted to engage said arm and to open the switch.

12. A chiropractic table comprising a base, supporting means upwardly projecting from said base, a table member pivoted on said supporting means for rotation about a horizontal axis, a motor associated with said base, a power shaft, means whereby movement of said shaft in a single direction may cause movement of said table member in reverse directions, and means for automatically terminating the movement of said shaft at the termination of the predetermined excursions of the table member, including an electric switch adapted to control said motor and automatic means for opening said switch at the termination of the predetermined excursions of the table member, said switch including a fixed member, a movable member, a rock shaft, an arm thereon on which said movable member is mounted, and a member, associated with the driving connection between motor and table member, adapted to engage said arm and to open the switch, and a brake associated with the driving connection between table member and motor and operable in response to movement of said rock shaft.

13. In a chiropractic table comprising a base, a table member pivoted above said base for rotation about a horizontal axis, a motor, and a driving connection between said motor and said table member adapted, in response to rotation of the motor in a single direction, to cause movement of said table member in reverse directions, a shaft associated with said driving connection and having projecting from it a plurality of members, said shaft being adapted to rotate in a single direction, a control switch for said motor, having a fixed member and a pivoted member, means for manually closing said switch by moving said pivoted member into contact with said fixed member, said pivoted member being in line with the outwardly projecting members on said shaft, said members being adapted, in response to rotation of the motor, to contact said pivoted member and to open said switch.

14. In a chiropractic table comprising a base, a table member pivoted above said base for rotation about a horizontal axis, a motor, and a driving connection between said motor and said table member adapted, in response to rotation of the motor in a single direction, to cause movement of said table member in reverse directions, a control switch for said motor, means for manually closing it to actuate said motor and means for automatically opening it, at the termination of the predetermined excursions of the table member in either direction, said switch including a fixed member, a movable member, a rock shaft, a support for said movable member, mounted on said rock shaft, and an element, associated with the drive between motor and table member, adapted to engage said support, at the termination of the predetermined excursions of the table member, to open the said switch.

Signed at Davenport, county of Scott and State of Iowa, this 2nd day of August, 1926.

DOSSA D. EVINS.